United States Patent

Flanagan et al.

[15] 3,644,245
[45] Feb. 22, 1972

[54] HOT MELT ADHESIVES CONTAINING SILANE COMPOUNDS

[72] Inventors: Thomas P. Flanagan, Green Brook; Irving Kaye, Murray Hill, both of N.J.

[73] Assignee: National Starch and Chemical Corporation, New York, N.Y.

[22] Filed: June 25, 1969

[21] Appl. No.: 836,642

[52] U.S. Cl. ..........................260/23, 106/171, 106/173, 106/191, 106/193, 161/203, 161/216, 161/220, 260/24, 260/27, 260/28, 260/28.5, 260/33, 260/45.7, 260/45.95, 260/78, 260/824, 260/876
[51] Int. Cl. .............................................C08f 21/04
[58] Field of Search ..............106/173, 171, 191; 260/24, 260/27 R, 27 EV23, 28.5, 28, 78, 33.6, 824, 876

[56] References Cited

UNITED STATES PATENTS

| | | | |
|---|---|---|---|
| 2,898,313 | 8/1959 | Ericks | 106/163 |
| 3,045,036 | 7/1962 | Jex et al. | 260/824 |
| 3,492,372 | 1/1970 | Flanagan | 260/27 |

FOREIGN PATENTS OR APPLICATIONS

| | | |
|---|---|---|
| 1,019,851 | 2/1966 | Great Britain |

OTHER PUBLICATIONS

Dow Corning " Silane Coupling Agents" 1967, pp. 8 to 24 relied on

*Primary Examiner*—Hosea E. Taylor
*Assistant Examiner*—William E. Parker
*Attorney*—Thomas B. Graham

[57] ABSTRACT

Hot melt adhesive compositions characterized by their improved adhesion under conditions of high humidity or moisture; said adhesives comprising a blend of a synthetic polymer base and a specified silane compound.

5 Claims, No Drawings

HOT MELT ADHESIVES CONTAINING SILANE COMPOUNDS

BACKGROUND OF THE INVENTION

Hot melt adhesives are solid combinations of film forming resins, tackifying resins, rubbery polymers, plasticizers, waxes and similar materials which may be added to the composition in order to impart various desired properties. Adhesive bonds derived from hot melts are particularly useful because of their tackiness in the molten state and the speed with which they form strong bonds.

Hot melt adhesives are bonding agents which achieve a solid state and resultant strength by cooling as contrasted with other adhesives, such as resin emulsion or lacquer adhesives, which achieve the solid state through evaporation or removal of solvents. A hot melt is a thermoplastic material which is in the form of a 100 percent, by weight, solid. Application of heat melts the solid hot melt and brings it to the liquid state and, after removal of heat, it sets by simple cooling. The latter behavior is in direct contrast to thermosetting adhesives which set or harden by the application of heat and which remain hard upon continued application of heat.

One of the disadvantages inherent in most hot melt adhesives is the fact that they are somewhat limited with regard to their use in adhering various substrates to the surfaces of glass containers since, under conditions of high humidity or dampness, the adhesive bonds obtained with hot melts will often deteriorate to a significant degree. Accordingly, since bottles, jars and other glass containers will often be stored or used under conditions wherein they are exposed to a high humidity or to substantial amounts of moisture, the use of most commercially available hot melts under such conditions has led to unsatisfactory results. One attempt to overcome this problem did succeed in providing a humidity resistant hot melt. However, it was based upon a highly reactive system and, as a result, it displayed extremely poor heat stability.

Thus, it is the prime object of this invention to provide hot melt adhesive compositions which display outstanding resistance to conditions of high humidity and moisture without detracting from any of the other properties which are ordinarily necessary in such adhesives. A further object of this invention is to provide hot melt adhesives which are particularly suited for the bonding of various substrates to the surface of glass containers. Various other objects and advantages of this invention will be apparent to the practitioner from the following description thereof.

TECHNICAL DISCLOSURE OF THE INVENTION

We have now discovered that it is possible to prepare hot melt adhesive compositions whose use results in the formation of adhesive bonds characterized by their outstanding resistance to conditions of high humidity and moisture by blending a synthetic polymer adhesive base, as set forth hereinbelow, with a specified silane compound.

The silane compounds whose presence is necessary in the novel adhesives of this invention may be selected from the group of silane compounds consisting of:

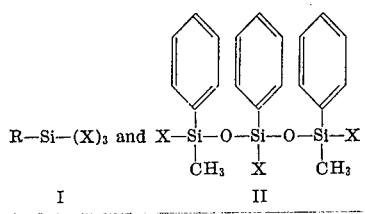

wherein R is a group selected from the class consisting of the vinyl i.e., ethenyl; gamma-methacryloxypropyl; beta-(3,4-epoxycyclohexyl); mercaptopropyl; gamma-glycidoxypropyl; gamma-aminopropyl; N-bis(beta-hydroxyethyl) gamma-aminopropyl; N-beta-(aminoethyl)-gamma-aminopropyl; amyl; ethyl; phenyl; and, methyl groups; and, X is a group which can hydrolyze to yield a hydroxyl group and which is selected from the class consisting of the chloro; ethoxy; acetoxy; beta-methoxyethoxy; and methoxy groups.

Specific examples of silane compounds corresponding to formula I, hereinabove, are vinyltrichlorosilane; vinyltriethoxysilane; vinyl-tris(beta-methoxyethoxy)silane; gamma-methacryloxypropyltrimethoxysilane; beta-(3,4-epoxycyclohexyl)-ethyltrimethoxysilane; gamma-glycidoxypropyltrimethoxysilane; gamma-aminopropyltriethoxysilane; N-bis(beta-hydroxyethyl)gamma-aminopropyltriethoxysilane; N-beta-(aminoethyl)-gamma-aminopropyltrimethoxysilane; ethyltriethoxysilane; amyltriethoxysilane; ethyltrichlorosilane; amyltrichlorosilane; phenyltrichlorosilane; phenyltriethoxysilane; methyltrichlorosilane; methyltriethoxysilane; vinyltriacetoxysilane; and, gamma-mercaptopropyltrimethoxy silane.

A specific example of a silane compound corresponding to formula II, hereinabove, is dimethyltriphenyltrimethoxytrisiloxane.

The synthetic polymer which comprises the adhesive base for our novel hot melt compositions may be selected from the group consisting of:

1. polyamides, i.e., the polymers resulting from the condensation between polyamines, such as hexamethylene diamine or ethylene diamine, with a polycarboxylic acid such as adipic acid, dimerized or polymerized linoleic acid, and sebacic acid; the latter polyamide resins having a softening point, as determined by ASTM method E 28–58T, of from about 90° to 125° C.;

2. polyolefins such as polyethylene and polypropylene; the latter polyolefins having a molecular weight in the range of from about 1,500 to 20,000;

3. cellulosic resins such as ethyl cellulsoe, cellulose acetate and cellulose acetate butyrate;

4. copolymers of ethylene and vinyl acetate which contain from about 4 to 16 moles of ethylene per mole of vinyl acetate;

5. polyvinyl butyral;

6. polyvinyl methyl ether;

7. polyvinyl acetate and the random copolymers containing at least about 40 percent, by weight, of vinyl acetate with one or more monomers selected from the group consisting of
   a. the alkyl esters of acrylic and methacrylic acids, wherein said alkyl group contains from one to about 10 carbon atoms, such, for example, as methyl acrylate, butyl acrylate, 2-ethylhexyl acrylate, and the corresponding methacrylate esters;
   b. anhydrides of ethylenically unsaturated dicarboxylic acids, such, for example, as maleic anhydride; and,
   c. the dialkyl esters of ethylenically unsaturated dicarboxylic acids, wherein said alkyl group contains from one to about eight carbon atoms, such, for example, as dibutyl maleate; and 8. homopolymers of the $C_1$–$C_4$ alkyl esters of methacrylic acid such, for example, as polymethylmethacrylate, and the random copolymers of two or more of the latter $C_1$–$C_4$ alkyl esters of methacrylic acid with one another such, for example, as the copolymer of n-butyl and isobutyl methacrylate.

The procedure for preparing these novel hot melt adhesive compositions involves placing the adhesive base and any optional tackifiers or diluents, as described below, in a steam or oil jacketed mixing kettle equipped with means for applying mechanical agitation. Thereupon, the temperature should be raised to a range of from about 150° to 350° F., the precise temperature utilized depending upon the melting point of the adhesive base which is selected. When the adhesive base has melted, stirring is initiated and the silane compound is then added. Stirring and heating are continued until the silane compound is completely incorporated into the molten adhesive base. The addition of water is to be avoided since its presence would result in the premature hydrolysis of the silane compound.

The resulting hot melt adhesive composition can then be drawn off and may be used immediately in hot pots in the manner to be described hereinbelow. It may also be molten-extruded into rope form or converted into pellets, rods, cylinders, slugs or billets, or it may be granulated or diced depending upon the equipment which will subsequently be used to apply the hot melt. As another alternative, the freshly prepared adhesive may be placed into cooling pans and held in bulk form for later use.

With regard to proportions, the hot melts of his invention should contain at least about 0.1 percent, by weight, as based on the total weight of the resulting composition, of one or more of the above-described silane compounds in order to be able to demonstrate their improved resistance to conditions of moisture and high humidity. It is not ordinarily advantageous to utilize more than about 5 percent, by weight, of one or more of these silane compounds in our novel hot melts inasmuch as their use in higher concentrations does not appear to lead to any further improvements in their properties. Optimum results have been obtained with hot melts having a concentration of from about 2 to 2.5 percent, by weight, of one or more silane compounds.

As a desirable optional ingredient, a diluent may be employed in our novel systems, in a concentration of up to about 50 percent, by weight, of the total weight of the composition in order to reduce the melt viscosity or cohesive characteristics of the hot melt adhesive composition without appreciably decreasing its adhesive binding characteristics. Among the applicable wax diluents are included: liquid polybutene or polypropylene having a low molecular weight in the range of from about 700 to 1,200; petroleum waxes such, for example, as paraffin and microcrystalline waxes; polyethylene greases having a molecular weight of less than 1,000; hydrogenated animal, fish and vegetable fats; mineral oil; and, synthetic waxes such, for example, as Fischer-Tropsch wax.

Still another highly desirable class of optional additives which may be utilized in our novel hot melts are the so called tackifiers or plasticizers which serve to enhance the adhesion, soften, flexibilize and introduce tack into the products of this invention. Such plasticizers may be present in our compositions in a concentration of up to about 70%, by weight, as based on the total weight of the composition. They may be selected from the group consisting of:

1. natural and modified rosins such, for example, as gum rosin, wood rosin, tall-oil rosin, distilled rosin, hydrogenated rosin, dimerized rosin, disproportionated and polymerized rosin; the term "modified rosins" also referring to esters of the above noted natural and modified rosins including glycerol, methyl triethylene glycol and pentaerythritol esters of these rosins such, for example, as the glycerol ester of wood rosin, the glycerol ester of hydrogenated rosin, the triethylene glycol ester of hydrogenated wood rosin, the methyl ester of wood rosin and the pentaerythritol ester of polymerized rosin;

2. polyterpene resins having a softening point, as determined by ASTM method E 28-58T, of from about 10° to 150° C.; the latter polyterpene resins generally resulting from the polymerization of terpene hydrocarbons, such as the bicyclic mono-terpene known as pinene, in the presence of Friedel-Crafts catalysts at moderately low temperatures;

3. cumarone-indene resins having a Ball and Ring softening point of from about 10° to 160° C.;

4. polystyrene and random copolymers of styrene in combination with at least one different ethylenically unsaturated aromatic compound such, for example, as vinyl toluene and alpha-methyl styrene; the latter homo and copolymers having a Ball and Ring softening point of from about 55° to 120° C.

5. petroleum derived aliphatichydrocarbon resins having a Ball and Ring softening point of from about 80° to 120° C.; the latter resins resulting from the polymerization of monomers consisting primarily of olefins and diolefins containing five carbon atoms therein;

6. phenolic-modified terpene resins such, for example, as the resin product resulting from the condensation, in an acidic medium, of a bicyclic terpene and a phenol; the latter resins having a Ball and Ring softening point of from about 90° to 160° C.;

7. chlorinated terphenyl and diphenyl resins containing from about 42 to 65 percent, by weight, of chlorine;

8. alkyl phthalate esters such, for example, as dibutyl and dioctyl phthalate;

9. aryl phosphate esters such, for example, as tricresyl and triphenyl phosphate;

10. aryl sulfonamide derivatives such, for example, as N-ethyl para-toluene sulfonamide, para-toluene sulfonamide and N-cyclohexyl para-toluene sulfonamide; and, 11. glycollate esters of phthalic acid such, for example, as butyl phthalyl butyl glycollate; ethyl phthalyl ethyl clycollate and methyl phthalyl ethyl glycollate.

Other optional additives may be incorporated into the hot melt compositions of this invention in order to modify certain properties thereof. Among these additives may be included: stabilizers and antioxidants such, for example, as butylated hydroxytoluene, high molecular weight hindered phenols, and substituted phosphites; colorants such as titanium dioxide and watchung red; and, fillers such as clay and talc, etc.

The novel hot melts of this invention may be effectively utilized in a variety of packaging, laminating, carton sealing and book binding operations. Thus, they can be coated onto and used for the lamination of various types of solid substrates including, for example, metallic foils, paper, coated paper, corrugated board, paper board, cellophane and polyolefin films. However, as has been pointed out, hereinabove, our adhesives display particular utility for adhering paper substrates, such as labels and government tax stamps, to the surface of glass containers such as bottles and jars. The resulting adhesive bonds between the glass and the paper substrates are found to display outstanding resistance to the conditions of high humidity and moisture to which such glass containers are often exposed.

The actual application of the hot melt compositions of this invention may be accomplished by the use of any conventional hot melt equipment. Ordinarily, the adhesive is first premelted at a temperature of about 150° to 300° F. whereupon it is placed into an applicator pot which is at a temperature of about 200° to 350° F. An applicator roll or extrusion tube can then be used to apply either an overall coating or a patterned strip of the adhesive to any desired substrate; the latter coating should have a final dry thickness of from about 0.5 to 4.0 mils. The thus coated substrate should then be immediately applied or transferred to the surface of the substrate upon which it is to be adhered. If the latter substrate is one having an irregular shape or surface, a compression pad, wiping brush or rolls may be passed over the external face of the adhesive coated substrate so as to conform its shape to that of the surface upon which it has been applied. As the adhesive coating cools down to room temperature, the bonding process will be completed.

The following examples will further illustrate the embodiment of this invention. In these examples all parts given are by weight unless otherwise noted.

EXAMPLE I

This example illustrates the use of a variety of silane compounds and synthetic polymer bases in the preparation of a number of different formulations typical of the novel hot melt adhesives of this invention. Also included is a comparison of certain properties of these adhesive formulations with products which were identical in their composition and method of preparation with the exception that they did not, however, contain a silane compound component.

All of the adhesive formulations which are described in the following table were prepared by means of a procedure in which the specified synthetic polymer adhesive base was first introduced into an oil jacketed, stainless steel kettle equipped with means for applying mechanical agitation and which was being maintained at a temperature of about 300° F. Under agitation, the adhesive base was completely melted and, at this point any diluents and/or tackifiers were added.

Next, the silane compound, where included in the formulation, was added and agitation was then continued until it was completely admixed with the molten adhesive base. The resulting formulation was then maintained, under agitation, at a temperature of about 225° F. Each of the thus prepared formulation, while still at a temperature of about 225° F., was then applied to one complete surface of each of three samples of a ½-inch by 5-inch strip of label stock so as to provide a film having a final dry thickness of 3 mils (1 mil = 0.001 inch). The thus-coated labels were then immediately applied to the surface of an 8-ounce glass bottle.

A number of different testing procedures were then used to evaluate the adhesive bonds of the thus labeled bottles. The first of these tests evaluated their initial adhesion upon cooling to room temperature. This test involved an attempt to remove or delaminate the label from the bottle by picking it off with the fingers. As is seen in table I which reports on the results of this test, delamination was not possible with any of the specimens, including those in which the adhesive did not contain a silane compound, as was indicated by a tearing of the paper label upon its attempted removal from the bottle, i.e., in each case a "tearing" bond had been developed.

In the so called "iceproofness" test, a specimen of each of the labeled bottles was completely immersed in water which was at at temperature of 35° F. Each bottle was then examined after an interval of 3 hours and again after an interval of 4 days. At these examinations, it was noted whether:

1. the label was still strongly adhered to the bottle as evidenced by the existence of tearing bond;
2. the label could be readily peeled off from the bottle without offering any resistance so as to leave the glass surface clean and without any transfer of adhesive; or,
3. the label had voluntarily delaminated from the bottle. The results of this test are also included in table I in which the term "tearing" designates a tearing bond, the term "weak" is applied to a bond which permitted the label to be readily peeled off and "delaminated" indicates that the label had voluntarily delaminated. The latter designations are also used, in the table, to indicate the results of the humidity resistance test as described below.

The humidity resistance of each adhesive formulation was evaluated by placing a specimen of each of the labeled bottles in a cabinet having a controlled relative humidity of 95 percent and a temperature of 72° F. Each bottle was then examined at intervals of 24, 48 and 72 hours whereupon it was noted whether:

1. the label was still strongly adhered to the bottle as evidenced by a tearing bond; or,
2. whether the label could be readily peeled off without offering any resistance so as to leave the glass surface clean and without any transfer of adhesive. The results of this test are also included in table I, herein-below.

In the various formulations set forth below the different silane compounds which were utilized are identified as follows:

No. 1 = Amyltriethoxysilane
No. 2 = Vinyltriacetoxysilane
No. 3 = N-beta-(aminoethyl)-gamma-aminopropyltrimethoxysilane
No. 4 = Dimethyltriphenyltrimethoxytrisiloxane
No. 5 = Phenyltriethoxysilane
No. 6 = Phenyltrimethoxysilane
No. 7 = Gamma-glycidoxypropyltrimethoxysilane
No. 8 = Phenyltrichlorosilane.

The composition, in parts by weight, of the various adhesive formulations which were prepared is set forth hereinbelow. It is to be noted that those formulations designated by a number and a letter contained a silane compound while those formulations designated by a number alone were controls which did not contain a silane compound.

| Formulation | No. 1 | No. 1a |
|---|---|---|
| Ethylene:vinyl acetate (8:1) copolymer | 20 | 20 |
| Gum rosin | 65 | 65 |
| Paraffin | 10 | 10 |
| Mineral oil | 5 | 5 |
| Silane No. 1 | — | 2.5 |

| | No. 2 | No. 2a |
|---|---|---|
| Polyamide resin resulting from condensation of ethylene diamine and linoleic acid dimer, said resin having a softening point of about 100° C. | 40 | 40 |
| Glycerol ester of wood rosin | 27 | 27 |
| N-ethyl para-toluene sulfonamide | 33 | 33 |
| Silane No. 5 | — | 2.5 |

| | No. 3 | No. 3a |
|---|---|---|
| Polyethylene having a molecular weight of about 2,000 | 50 | 50 |
| Polyterpene resin having a softening point of about 115° C. | 35 | 35 |
| Liquid polybutene having a molecular weight of about 600 | 15 | 15 |
| Silane No. 8 | — | 2.5 |

| Number | 4 | 4a | 4b | 4c | 4d | 4e | 4f |
|---|---|---|---|---|---|---|---|
| Ethylene:vinyl acetate (8:1) copolymer | 20 | 20 | 20 | 20 | 20 | 20 | 20 |
| Gum rosin | 65 | 65 | 65 | 65 | 65 | 65 | 65 |
| Paraffin | 10 | 10 | 10 | 10 | 10 | 10 | 10 |
| Mineral oil | 5 | 5 | 5 | 5 | 5 | 5 | 5 |
| Silane #2 | | 2.5 | 2.0 | 1.0 | 0.1 | | |
| Silane #3 | | | | | | 2.5 | |
| Silane #4 | | | | | | | 2.0 |

| | No. 5 | No. 5a |
|---|---|---|
| Ethyl cellulose | 10 | 10 |
| Polymerized rosin | 45 | 45 |
| Methyl ester of wood rosin | 45 | 45 |
| Silane No. 5 | — | 2.5 |

| | No. 6 | No. 6a |
|---|---|---|
| Polypropylene | 75 | 75 |
| Petroleum derived aliphatic hydrocarbon resin, softening point about 100° C. | 25 | 25 |
| Silane No. 5 | — | 2.5 |

| | No. 7 | No. 7a |
|---|---|---|
| Ethylene:vinyl acetate (8:1) copolymer | 30 | 30 |
| Hydrogenated rosin | 70 | 70 |
| Silane No. 6 | — | 2.0 |

| | No. 8 | No. 8a |
|---|---|---|
| Polyvinyl butyral | 10 | 10 |
| Methyl ester of wood rosin | 40 | 40 |
| Glycerol ester of wood rosin | 30 | 30 |
| Hydrogenated castor oil | 40 | 40 |
| Silane No. 5 | — | 2.5 |

| | No. 9 | No. 9a |
|---|---|---|
| Polyvinyl methyl ether | 20 | 20 |
| Gum rosin | 55 | 55 |
| Triethylene glycol ester of wood rosin | 15 | 15 |
| Hydrogenated castor oil | 10 | 10 |
| Silane No. 5 | — | 2.5 |

| | No. 10 | No. 10a |
|---|---|---|
| Ethylene:vinyl acetate (8:1) copolymer | 20 | 20 |
| An alpha-pinene derived polyterpene resin, softening point about 115° C. | 20 | 20 |
| Mineral oil | 20 | 20 |
| Paraffin | 40 | 40 |
| Silane No. 7 | — | 2.0 |

| | No. 11 | No. 11a |

| | | |
|---|---|---|
| Polyvinyl acetate | 65 | 65 |
| Chlorinated diphenyl resin having a chlorine content of about 54%, by weight | 10 | 10 |
| Butyl phthalyl butyl glycollate | 25 | 25 |
| Silane No. 5 | — | 2.5 |
| | No. 12 | No. 12a |

| | | |
|---|---|---|
| Polyamide resin resulting from condensation of ethylene diamine and linoleic acid dimer, softening point about 100° C. | 100 | 100 |
| Silane No. 5 | — | 2.5 |
| | No. 13 | No. 13a |

| | | |
|---|---|---|
| Ethylene:vinyl acetate (8:1) copolymer | 17.5 | 17.5 |
| Glycerol ester of hydrogenated rosin | 60 | 60 |
| Mineral oil | 12.5 | 12.5 |
| Paraffin | 10 | 10 |
| Silane No. 5 | — | 2.5 |
| | No. 14 | No. 14a |

| | | |
|---|---|---|
| Vinyl acetate:2-ethyl hexyl acrylate (1:1) copolymer | 50 | 50 |
| Glycerol ester of hydrogenated rosin | 50 | 50 |
| Silane No. 5 | — | 2.5 |
| | No. 15 | No. 15a |

| | | |
|---|---|---|
| Poly n-butyl methacrylate | 40 | 40 |
| Glycerolester of hydrogenated rosin | 60 | 60 |
| Silane No. 6 | — | 5.0 |
| | No. 16 | No. 16a |

| | | |
|---|---|---|
| Polyethylene having a molecular weight of about 12,000 | 25 | 25 |
| Polyterpene resin having a softening point of about 70° C. | 35 | 35 |
| Polyethylene grease | 45 | 45 |
| Silane No. 6 | — | 2.0 |
| | No. 17 | No. 17a |

| | | |
|---|---|---|
| Ethylene:vinyl acetate (8:1) copolymer | 20 | 20 |
| Glycerol ester of wood rosin | 60 | 60 |
| Fischer Tropsch Wax | 10 | 10 |
| Mineral oil | 10 | 10 |
| Silane No. 6 | — | 2.0 |
| | No. 18 | No. 18a |

| | | |
|---|---|---|
| Ethylene:vinyl acetate (4.5:1) copolymer | 20 | 20 |
| Styrene:alpha-methylstyrene copolymer, softening point of about 75° C. | 80 | 80 |
| Silane No. 5 | — | 2.0 |
| | No. 19 | No. 19a |

| | | |
|---|---|---|
| Polyvinyl acetate | 60 | 60 |
| Terpene phenolic resin, softening point of about 100° C. | 20 | 20 |
| Tricresyl phosphate | 20 | 20 |
| Silane No. 4 | — | 2.5 |

TABLE

| Formulation No. | Iceproofness test | | | Humidity resistance test | | |
|---|---|---|---|---|---|---|
| | Initial bond | 3 hours | 4 days | 24 hours | 48 hours | 72 hours |
| 1 | Tearing | Weak | Delam | Weak | Weak | Weak. |
| 1a | do | Tearing | Tearing | Tearing | Tearing | Tearing. |
| 2 | do | Weak | Delam | Weak | Weak | Weak. |
| 2a | do | Tearing | Tearing | Tearing | Tearing | Tearing. |
| 3 | do | Weak | Delam | Weak | Weak | Weak. |
| 3a | do | Tearing | Tearing | Tearing | Tearing | Tearing. |
| 4 | do | Weak | Delam | Weak | Weak | Weak. |
| 4a | do | Tearing | Tearing | Tearing | Tearing | Tearing. |
| 4b | do | do | do | do | do | Do. |
| 4c | do | do | do | do | do | Do. |
| 4d | do | Partial tearing. | Partial tearing. | Partial tearing. | Partial tearing. | Partial tearing. |
| 4e | do | Tearing | Tearing | Tearing | Tearing | Tearing. |
| 4f | do | do | do | do | do | Do. |
| 5 | do | Weak | Delam | Weak | Weak | Weak. |
| 5a | do | Tearing | Tearing | Tearing | Tearing | Tearing. |
| 6 | do | Weak | Delam | Weak | Weak | Weak. |
| 6a | do | Tearing | Tearing | Tearing | Tearing | Tearing. |
| 7 | do | Weak | Delam | Weak | Weak | Weak. |
| 7a | do | Tearing | Tearing | Tearing | Tearing | Tearing. |
| 8 | do | Weak | Delam | Weak | Weak | Weak. |
| 8a | do | Tearing | Tearing | Tearing | Tearing | Tearing. |
| 9 | do | Weak | Delam | Weak | Weak | Weak. |
| 9a | do | Tearing | Tearing | Tearing | Tearing | Tearing. |
| 10 | do | Weak | Delam | Weak | Weak | Weak. |
| 10a | do | Tearing | Tearing | Tearing | Tearing | Tearing. |
| 11 | do | Weak | Delam | Weak | Weak | Weak. |
| 11a | do | Tearing | Tearing | Tearing | Tearing | Tearing. |
| 12 | do | Weak | Delam | Weak | Weak | Weak. |
| 12a | do | Tearing | Tearing | Tearing | Tearing | Tearing. |
| 13 | do | Weak | Delam | Weak | Weak | Weak. |
| 13a | do | Tearing | Tearing | Tearing | Tearing | Tearing. |
| 14 | do | Weak | Delam | Weak | Weak | Weak. |
| 14a | do | Tearing | Tearing | Tearing | Tearing | Tearing. |
| 15 | do | Weak | Delam | Weak | Weak | Weak. |
| 15a | do | Tearing | Tearing | Tearing | Tearing | Tearing. |
| 16 | do | Weak | Delam | Weak | Weak | Weak. |
| 16a | do | Tearing | Tearing | Tearing | Tearing | Tearing. |
| 17 | do | Weak | Delam | Weak | Weak | Weak. |
| 17a | do | Tearing | Tearing | Tearing | Tearing | Tearing. |
| 18 | do | Weak | Delam | Weak | Weak | Weak. |
| 18a | do | Tearing | Tearing | Tearing | Tearing | Tearing. |
| 19 | do | Weak | Delam | Weak | Weak | Weak. |
| 19a | do | Tearing | Tearing | Tearing | Tearing | Tearing. |

The data presented in the above table is clearly indicative of the substantial improvement in resistance to conditions of high humidity and moisture which is displayed by the novel silane containing hot melt adhesives of this invention when the latter products were compared, under identical conditions, with comparable formulations which did not, however, contain these silane esters.

It is, thus, seen that this invention provides the practitioner with novel hot melt adhesives which are ideally suited for bottle labeling applications wherein their resistance to conditions of high humidity and moisture is of great value.

Variations may be made in proportions, procedures and materials without departing from the scope of this invention as defined by the following claims.

What is claimed is:

1. A hot melt adhesive composition consisting essentially of a blend of (A) a synthetic thermoplastic polymer adhesive base selected from the group consisting of polyamides resulting from the condensation reaction of polyamines and polycarboxylic acids; polyolefins; cellulosic esters and ethers; copolymers and ethylene and vinyl acetate which contain from 4 to 16 moles of ethylene per mole of vinyl acetate; polyvinyl butyral; polyvinyl methyl ether; polyvinyl acetate and the random copolymers containing at least about 40 percent, by weight, of vinyl acetate with one or more monomers selected from the group consisting of the $C_1$-$C_{10}$ alkyl esters of acrylic and methacrylic acids, anhydrides of ethylenically unsaturated dicarboxylic acids, the dialkyl esters of ethylenically unsaturated dicarboxylic acids, wherein the alkyl group thereof contains from one to eight carbon atoms; homopolymers of the $C_1$-$C_4$ alkyl esters of methacrylic acid and the random copolymers of two or more of the latter esters with one another; and (B) a silane compound corresponding to the formulas

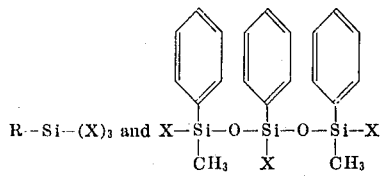

wherein R is a group selected from the class consisting of the ethenyl; gamma-methacryloxypropyl; beta-(3,4-epoxycyclohexyl); mercaptopropyl; gamma-glycidoxypropyl; gamma-aminopropyl; N-bis(beta-hydroxyethyl) gamma-aminopropyl; N-beta-(aminoethyl)-gamma-aminopropyl; amyl; ethyl; phenyl; and, methyl groups, and X is a group which can hydrolyze to yield a hydroxyl group and which is selected from the class consisting of the chloro; ethoxy; acetoxy; beta-methoxyethoxy; and methoxy groups.

2. The hot melt adhesive composition of claim 1, wherein said silane compound is present therein in a concentration of at least about 0.1 percent, by weight, of the total weight of said composition.

3. The hot melt adhesive composition of claim 1, wherein a diluent is also present therein in a concentration of up to about 50 percent, by weight, of the total weight of said composition, said diluent being selected from the group consisting of liquid polybutenes and polypropylenes having a molecular weight in the range of from about 700 to 1,200; petroleum waxes; polyethylene greases having a molecular weight of less than 1,000; hydrogenated animal, fish and vegetable fats; mineral oil; and Fischer-Tropsch wax.

4. The hot melt adhesive composition of claim 1, wherein a tackifier is also present therein in a concentration of up to about 70 percent, by weight, of the total weight of said composition, said tackifier being selected from the group consisting of natural and modified rosins; polyterpene resins having a softening point of from about 10° to 150° C.; cumarone indene resins having a Ball and Ring softening point of from about 10° to 160° C.; polystyrene and random copolymers of styrene with at least one different ethylenically unsaturated aromatic monomer; petroleum derived aliphatic hydrocarbon resins having a Ball and Ring softening point of from about 80° to 120° C.; phenolic-modified terpene resins having a Ball and Rind softening point of from about 90° to 160° C.; chlorinated terphenyl and diphenyl resins containing from about 42 to 65 percent, by weight of chlorine; alkyl phthalate esters; aryl phosphate esters; aryl sulfonamide derivatives; and, glycollate esters of phthalic acid.

5. A hot melt adhesive composition comprising a blend of 17.5 parts of an ethylene:vinyl acetate copolymer, 60 parts of the glycerol ester of hydrogenated rosin, 12.5 parts of mineral oil, 10 parts of paraffin and 2.5 parts of phenyltriethoxysilane; all of the latter proportions being on a weight basis.

* * * * *